June 6, 1939. H. C. BOWEN 2,161,277
FLUID PRESSURE BRAKING SYSTEM
Filed Jan. 8, 1937
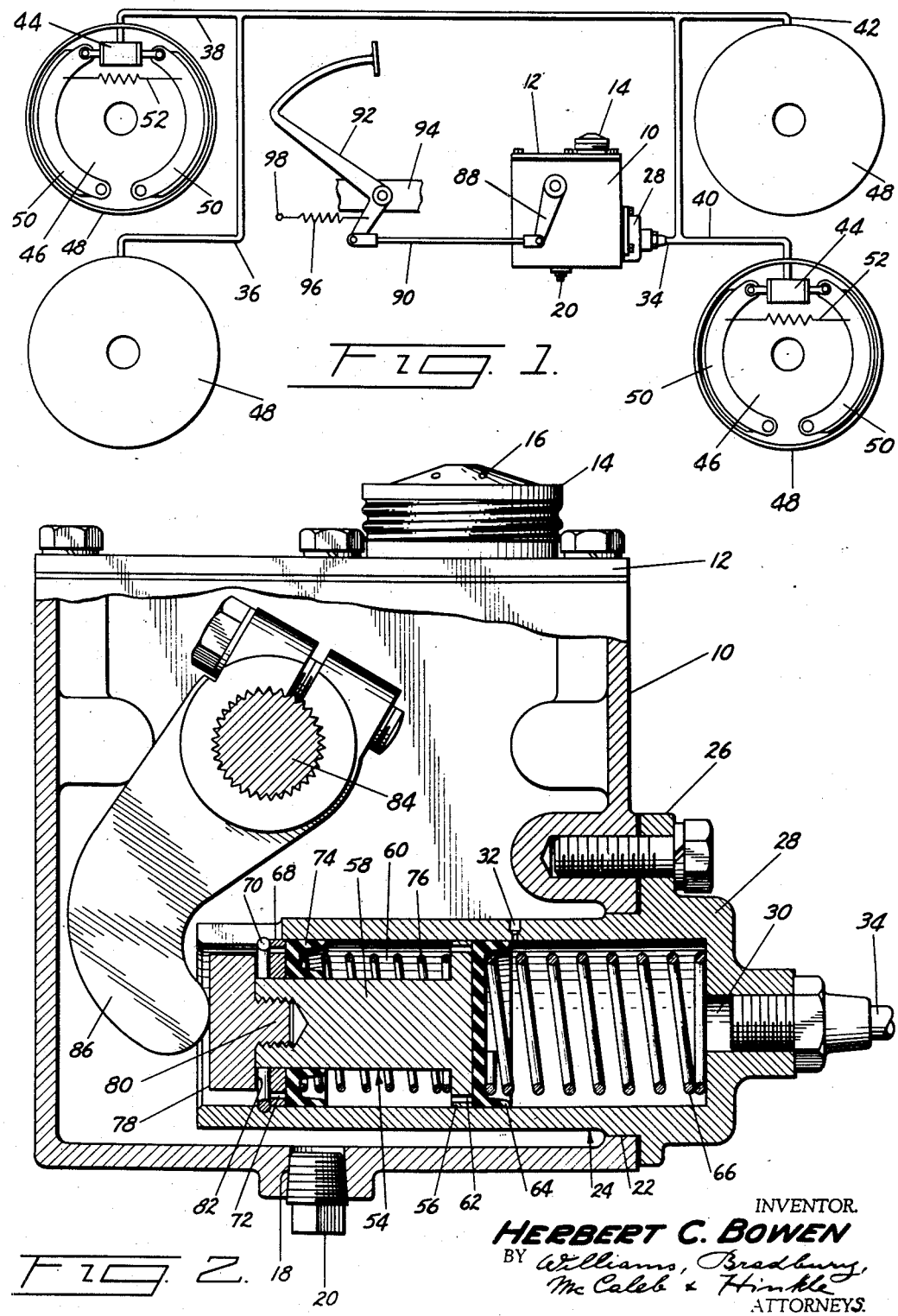
INVENTOR.
HERBERT C. BOWEN
BY Williams, Bradbury,
McCaleb & Hinkle
ATTORNEYS.

Patented June 6, 1939

2,161,277

UNITED STATES PATENT OFFICE 2,161,277

FLUID PRESSURE BRAKING SYSTEM

Herbert C. Bowen, Detroit, Mich., assignor to Hydraulic Brake Company, Detroit, Mich., a corporation of California Application January 8, 1937, Serial No. 119,654

9 Claims. (Cl. 60—54.6)

The invention relates to fluid pressure braking systems, and more particularly to fluid pressure producing devices.

Broadly the invention comprehends a fluid pressure braking system including a pressure producing device operative to overfill the system upon completion of each braking operation to the end that any air or gas bubbles in the fluid may be expelled therefrom so as to insure more satisfactory operation of the system.

An object of the invention is to provide a fluid pressure braking system including a pressure producing device operative to overfill the system upon completion of a braking operation.

Another object of the invention is to provide a fluid pressure producing device including a cylinder, a piston movable therein, and means associated with the cylinder and piston for pumping fluid.

Another object of the invention is to provide a fluid pressure producing device including a fluid reservoir, a cylinder supplied therefrom, a piston movable in the cylinder, and an expansible chamber associated therewith adapted to draw fluid from the reservoir on the compression stroke of the piston and to discharge fluid into the cylinder forward of the piston upon completion of the retraction stroke of the piston.

Other objects and advantages of the invention will appear from the following description taken in connection with the drawing forming a part of this specification, and in which, Fig. 1 is a diagrammatical illustration of a fluid pressure braking system embodying the invention; and Fig. 2 is a vertical, sectional view of the fluid pressure producing device.

Referring to the drawing for more specific details of the invention, 10 represents a fluid reservoir having a removable top 12 provided with a filling opening normally closed as by a cap 14 having suitable openings 16 for venting the reservoir to the atmosphere. The reservoir also has a drain opening 18 normally closed as by a plug 20, and arranged in the wall of the reservoir adjacent its bottom is an opening 22.

A cylinder 24 fitted snugly in the opening 22 has a flange 26 suitably secured to the wall of the reservoir so as to retain the cylinder against displacement. As shown, the cylinder is suspended in the reservoir in parallel relation to and adjacent the bottom of the reservoir. One end of the cylinder is closed as by a head 28 provided with a discharge port 30, and the other end of the cylinder opens into the reservoir. In the wall of the cylinder is a port 32 generally known as a compensating port.

Suitably connected to the discharge port 30 of the cylinder 24 is a fluid pressure delivery pipe or conduit 34 having branches 36, 38, 40 and 42 connected respectively to fluid pressure actuated motors 44 arranged in pairs, one pair for actuating the brakes associated with the front wheels of the vehicle and another pair for actuating the brakes associated with the rear wheels of the vehicle.

Each of the brakes preferably includes a fixed support or backing plate 46, a rotatable drum 48 associated therewith, a pair of corresponding interchangeable friction elements or shoes 50 pivoted on the backing plate, and a fluid pressure actuated motor corresponding to the motors 44 mounted on the backing plate between the shoes and operative to move the shoes into engagement with the drum against the resistance of a retractile spring 52 connecting the shoes.

A piston 54 reciprocable in the cylinder 24 includes a head 56 fitted snugly in the cylinder and a reduced body portion 58 providing in conjunction with the wall of the cylinder an annular chamber 60. The head has a plurality of spaced passages or ports 62 providing communications between the annular chamber 60 and that portion of the cylinder forward of the piston. A collapsible leak-proof cup 64 seated on the head of the piston controls the passages 62, and a spring 66 interposed between the cup and the head of the cylinder serves to retain the cup against displacement and also to return the piston to its retracted position.

An annular washer 68 sleeved on the reduced body portion 58 of the piston is retained against displacement by a ring 70 seated in a circumferential groove in the wall of the cylinder. This washer has a plurality of spaced passages or ports 72 providing communications between the reservoir 10 and the annular chamber 60. A collapsible leak-proof cup 74 encircling the reduced body portion 58 of the piston and seating on the annular washer 68 controls the ports 72. A spring 76 interposed between the cup 74 and the back of the head 56 of the piston serves to retain the cup against displacement and also provides a seat for the piston when in its retracted position.

A thrust block 78 is suitably secured to the piston. As shown, the thrust block has a concentric extension 80 threaded in an axial recess or bore in the reduced body portion 58 of the piston. This thrust block has a greater diameter than the diameter of the reduced body portion 58 providing an annular seat 82 adapted to receive and support the annular washer 68 during the compression stroke of the piston.

A shaft 84 mounted in the wall of the reservoir has suitably secured thereto within the reservoir an actuator 86 engaging the thrust block 78 by line contact, and secured to the shaft outside the reservoir is an arm 88 connected as by a rod 90 to a foot pedal lever 92 pivoted on a support 94 and connected by a retractile spring 96 to a fixed support 98.

Assuming that the system is properly installed in a motor vehicle and filled with a suitable fluid or liquid, under these conditions, upon depressing the foot pedal lever 92 force is transmitted from the lever through the rod 90, the arm 88, the shaft 84 and the actuator 86 to the piston 54, resulting in moving the piston on its compression stroke.

During the initial movement of the piston on its compression stroke, the cup 64 on the head of the piston covers the compensating port 32, and, thereafter, as the piston advances, the fluid in the cylinder 24 forward of the piston is displaced therefrom. Also, during the initial movement of the piston the restricted body portion 58 of the piston moves through the washer 68 seated on the retaining spring 70 and the collapsible cup 74 held on the washer by the spring 76.

The relative movement of the piston 54 and the cup 74 results in increasing the capacity of the chamber 60. This increase in capacity causes a partial vacuum in the chamber 60, resulting in collapse of the cup 74 and in drawing fluid from the reservoir 10 through the ports 72 in the washer 68 past the cup 74 into the chamber 60, completely filling the chamber 60 to its maximum increased capacity; whereupon the thrust block 78 engages the washer 68 and carries the washer and cup during the remainder of the forward stroke of the piston.

During the compression stroke of the piston the fluid displaced from the cylinder 24 passes through the discharge port 30 and the fluid pressure delivery pipe 34 and its respective branches into the fluid pressure actuated motors 44, causing actuation of the motors. This actuation of the motors causes movement of the friction elements or shoes 50 into engagement with the braking surface of the drums 48 against the resistance of the retractile springs 52, and this results in effectively retarding rotation of the drums.

Upon completion of a braking operation, the foot pedal lever 92 is released. Whereupon the pedal is returned to its retracted position under the influence of the retractile spring 96. As the foot pedal lever returns to its retracted position, the actuator 86 connected to the lever by the rod 90, the arm 88, and the shaft 84 is retracted. This results in release of the piston 54, whereupon the spring 66 becomes effective to return the piston to its retracted position; and as the piston returns to its retracted position fluid is returned from the fluid pressure delivery pipe or conduit 34 and its respective branches to the cylinder 24 under the influence of the retractile springs 52 connecting the shoes of the respective brakes.

The quantity of fluid returned to the cylinder may be slightly insufficient to completely fill the cylinder due to a very small quantity discharged from the cylinder through the compensating port 32 during the initial movement of the piston on its compression stroke before the cup 64 on the head of the piston completely covers the port. To compensate for this slight insufficiency of fluid to completely fill the cylinder, as the piston moves to its retracted position wherein it is balanced between the springs 66 and 76, a partial vacuum is produced in the cylinder 24 forward of the head of the piston. This results in drawing a slight quantity of fluid from the chamber 60 through the ports 62 in the head of the piston past the collapsible cup 64 into that portion of the cylinder forward of the piston, and just before the piston assumes its fully retracted position the washer 68 supporting the cup 74 seats on the retaining ring 70. This causes relative movement between the piston and the cup 74 resulting in contracting the chamber 60 to its minimum capacity, and as the capacity of the chamber is reduced to its minimum capacity a sufficient quantity of fluid is displaced therefrom through the ports 62 in the head of the piston 54 to overfill the cylinder 24. This surplus of fluid in the system passes from the cylinder 24 through the compensating port 32 into the reservoir 10 and carries with it any gas or air bubbles that may be present in the fluid. This overfilling of the cylinder 24 takes place at the conclusion of each brake operation, hence the system is maintained full of fluid and the fluid in the system is maintained free from gas or air bubbles.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is,

1. A fluid pressure producing device comprising a cylinder of uniform diameter throughout, a piston reciprocable therein, a variable chamber back of the piston, means for introducing fluid into the chamber on the compression stroke of the piston, and means including a floating piston for displacing fluid from the chamber on the retraction stroke of the piston.

2. A fluid pressure producing device comprising a reservoir, a cylinder supplied therefrom, a piston reciprocable in the cylinder, a variable chamber and floating piston means between the piston and the reservoir drawing fluid from the reservoir on the compression stroke of the piston and displacing fluid therefrom into that portion of the cylinder forward of the piston on the retraction stroke of the piston, means for reciprocating said first named piston independently of said floating piston, and a lost motion connection between said pistons.

3. A pressure producing device comprising a reservoir, a cylinder supplied therefrom, said cylinder being of uniform diameter throughout, a piston reciprocable in the cylinder, a variable chamber back of the piston communicating with the reservoir and that portion of the cylinder forward of the piston, and means including a floating piston controlling the communications so as to provide for passage of fluid from the reservoir into the cylinder on the compression stroke of the piston and the displacement of fluid from the chamber into the cylinder forward of the piston when the piston returns to its retracted position.

4. A fluid pressure producing device comprising a reservoir, a cylinder supplied therefrom, a piston reciprocable in the cylinder, a chamber back of the piston having ports communicating with the reservoir and with that portion of the cylinder forward of the piston and means including a floating piston controlling the ports operative to admit the passage of fluid from the reservoir to the chamber on the compression stroke of the piston and to displace fluid from the chamber into that portion of the cylinder forward of the piston on the return stroke of the piston, means for operating said first named piston, and a connection between said pistons whereby movement of said first named piston through a predetermined distance produces movement of said floating piston.

5. A fluid pressure producing device comprising a reservoir, a cylinder supplied therefrom, a piston reciprocable in the cylinder, a variable chamber back of the piston communicating with the reservoir and with that portion of the chamber forward of the piston, means including a floating piston for controlling the communications, means for expanding the chamber on the compression stroke of the piston, means for contracting the chamber on the retraction stroke of the piston, means independent of said floating piston for operating said first named piston, and a lost motion connection between said pistons.

6. A fluid pressure producing device comprising a reservoir, a cylinder supplied therefrom, a piston reciprocable in the cylinder having a reduced body portion, a variable annular chamber back of the piston having ports providing communications between the chamber and that portion of the cylinder forward of the piston, a collapsible leak-proof cup on the head of the piston controlling the ports, a closure for the annular chamber movable on the reduced body portion of the piston having ports providing communications between the chamber and the reservoir, a collapsible leak-proof cup on the closure controlling the ports therein, and means tending to enlarge the volume of the variable annular chamber.

7. In a fluid pressure braking system a fluid pressure producing device comprising a reservoir, a cylinder supplied therefrom, a piston reciprocable therein and having a reduced body portion, means movable on said reduced body portion for varying the volume of the chamber formed between said means and said piston, means tending to enlarge the volume of said variable chamber, means carried by the piston for unidirectionally controlling the flow of liquid past said piston, and means movable on the reduced body portion of said piston for unidirectionally controlling the flow of liquid past the last-named means movable on the reduced body portion for varying the volume of the chamber formed between this means and said piston.

8. In a fluid pressure braking system a fluid pressure producing device comprising a reservoir, a cylinder supplied therefrom, said cylinder being of uniform diameter, a piston reciprocable therein and having a reduced body portion, means for unidirectionally controlling the flow of liquid past said piston, means movable on said reduced body portion for forcing a quantity of fluid past the aforesaid means when the piston is returning to a position prior to its next fluid compressive movement.

9. A fluid pressure producing device comprising a reservoir, a cylinder supplied therefrom, a piston reciprocable in the cylinder having a reduced body portion, a variable annular chamber back of the piston having ports providing communications between the chamber and that portion of the cylinder forward of the piston, a collapsible leak-proof cup on the head of the piston controlling the ports, a closure for the annular chamber movable on the reduced body portion of the piston having ports providing communications between the chamber and the reservoir, a collapsible leak-proof cup on the closure controlling the ports therein, elastic means bearing on said closure and said piston, and means fastened to the aforesaid reduced body portion for causing said closure to follow the movement of said piston while the liquid in front of said piston is under compression.

HERBERT C. BOWEN.